United States Patent [19]
Seiner et al.

[11] Patent Number: 5,579,999
[45] Date of Patent: Dec. 3, 1996

[54] SHOCK-FREE SUPERSONIC ELLIPTIC NOZZLES AND METHOD OF FORMING SAME

[75] Inventors: John M. Seiner, Williamsburg, Va.; Roy S. Baty, Albuquerque, N.M.

[73] Assignee: The United States of America as represented by the United States National Aeronautics and Space Administration, Washington, D.C.

[21] Appl. No.: 408,333

[22] Filed: Mar. 22, 1995

Related U.S. Application Data

[63] Continuation-in-part of Ser. No. 357,364, Dec. 15, 1994, abandoned, which is a continuation of Ser. No. 95,563, Jul. 19, 1993, abandoned.

[51] Int. Cl.⁶ .................................................. B63H 11/00
[52] U.S. Cl. .................... 239/265.11; 244/53 B; 60/271
[58] Field of Search .................. 239/265.11; 60/271; 181/210, 213, 228; 244/12.1, 12.5, 53 B, 75 R

[56] References Cited

U.S. PATENT DOCUMENTS

| | | | |
|---|---|---|---|
| 2,546,293 | 3/1951 | Berliner | 60/271 X |
| 2,903,851 | 9/1959 | Fiedler | 239/265.11 |
| 3,027,713 | 4/1962 | Tyler et al. | 239/265.11 |
| 3,080,711 | 3/1963 | Connors . | |
| 3,428,257 | 2/1969 | Kentfield et al. . | |
| 3,443,757 | 5/1969 | Townend . | |
| 3,570,766 | 3/1971 | Johnson | 239/265.11 |
| 3,604,628 | 9/1971 | Haynie, Jr. . | |
| 4,012,166 | 3/1977 | Kaesser et al. . | |

*Primary Examiner*—Andres Kashnikow
*Assistant Examiner*—Lisa Douglas
*Attorney, Agent, or Firm*—Kimberly A. Chasteen

[57] ABSTRACT

A method of forming a shock-free supersonic elliptic nozzle, in which the nozzle to be designed is divided into three sections, a circular-to-elliptic section which begins at a circular nozzle inlet, an elliptic subsonic section downstream from the circular-to-elliptic section and a supersonic section downstream from the elliptic subsonic section. The maximum and minimum radii for each axial point in the circular-to-elliptic section and the elliptic subsonic section are then separately determined, the maximum and minimum radii being the radii for the widest part of an elliptic cross-section and the narrowest part of the elliptic cross-section, respectively. The maximum and minimum radii for each axial point in the supersonic section are determined based on the Method of Characteristics, Then, each of the three sections are based on the maximum and minimum radii for each axial point in the section. The resulting nozzle is acoustically superior.

15 Claims, 11 Drawing Sheets

CIRCULAR INLET → | 1 | 2 | 4 | 3 | 5 ELLIPTIC EXIT

CIRCULAR INLET → | 1 | 2 | 4 | 3 | 5 ELLIPTIC EXIT

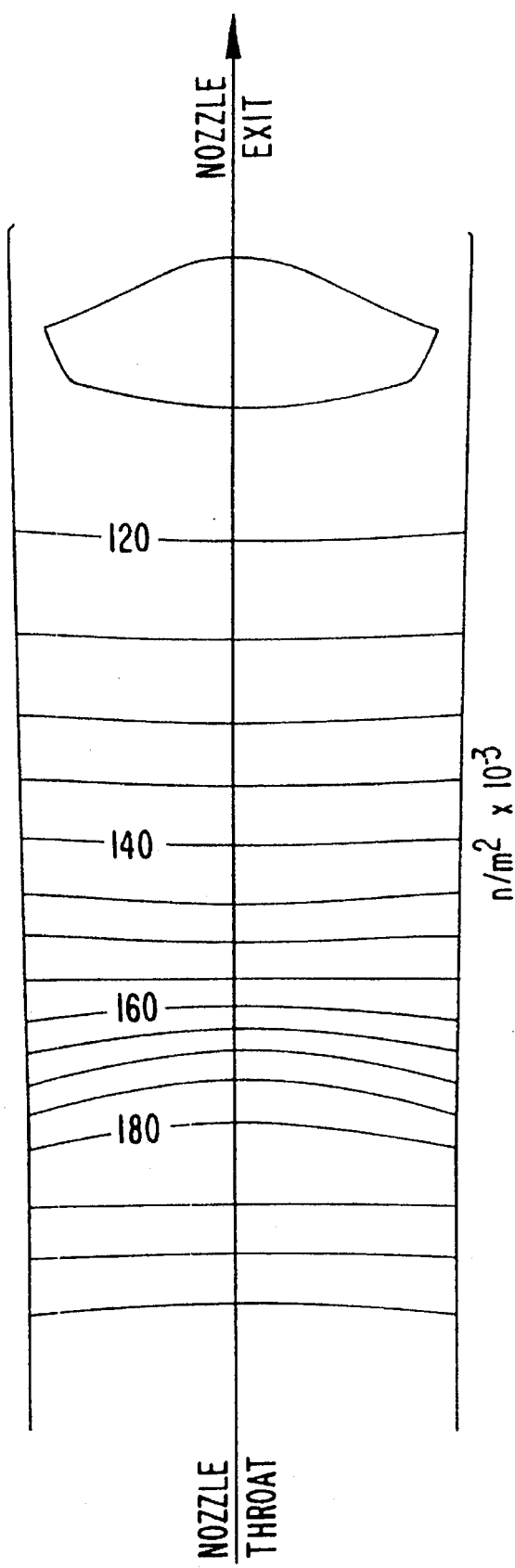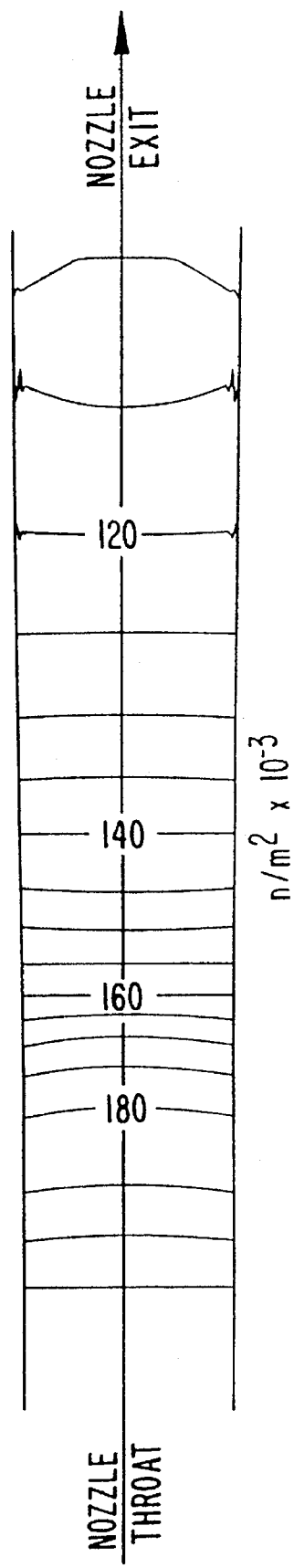

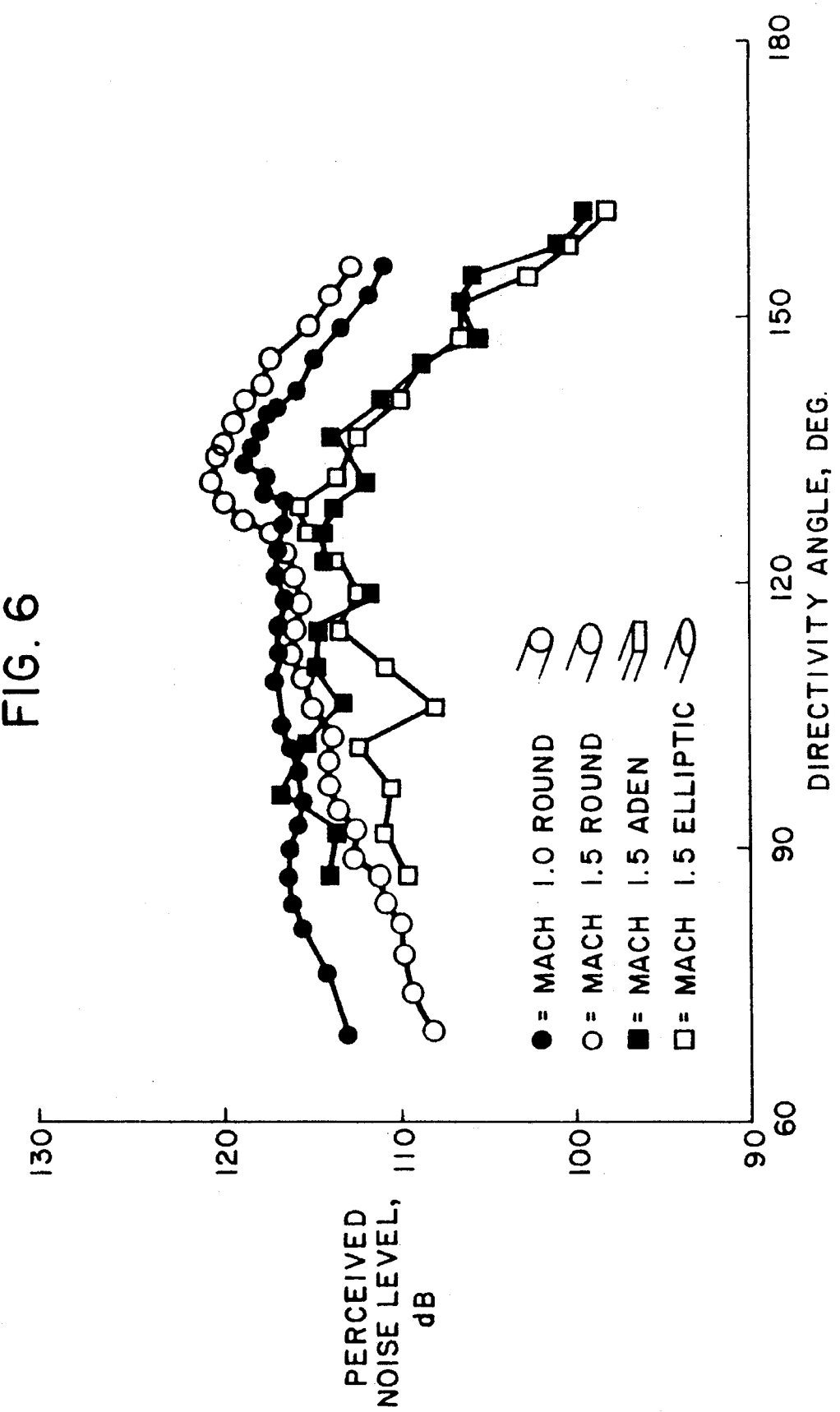

FIG. 7A

Complete Supersonic Mach 1.5 Elliptic Nozzle With Subsonic Section
Elliptic.Noz [.Nozzle]

| IPT | X (inches) | A (inches) | B (inches) | |
|---|---|---|---|---|
| 1 | 0.0000 | 1.4142 | 0.7071 | |
| 2 | 0.0289 | 1.4142 | 0.7071 | |
| 3 | 0.0539 | 1.4141 | 0.7071 | |
| 4 | 0.0789 | 1.4135 | 0.7068 | |
| 5 | 0.1039 | 1.4119 | 0.7059 | |
| 6 | 0.1289 | 1.4087 | 0.7044 | |
| 7 | 0.1539 | 1.4036 | 0.7018 | |
| 8 | 0.1789 | 1.3962 | 0.6981 | |
| 9 | 0.2039 | 1.3862 | 0.6931 | |
| 10 | 0.2289 | 1.3734 | 0.6867 | |
| 11 | 0.2539 | 1.3576 | 0.6788 | |
| 12 | 0.2789 | 1.3388 | 0.6694 | |
| 13 | 0.3039 | 1.3171 | 0.6585 | |
| 14 | 0.3239 | 1.2925 | 0.6462 | |
| 15 | 0.3539 | 1.2653 | 0.6326 | |
| 16 | 0.3789 | 1.2358 | 0.6179 | |
| 17 | 0.4039 | 1.2044 | 0.6022 | |
| 18 | 0.4289 | 1.1714 | 0.5857 | |
| 19 | 0.4539 | 1.1375 | 0.5687 | |
| 20 | 0.4789 | 1.1030 | 0.5515 | |
| 21 | 0.5039 | 1.0686 | 0.5343 | |
| 22 | 0.5289 | 1.0354 | 0.5177 | |
| 23 | 0.5539 | 1.0044 | 0.5022 | Subsonic Section |
| 24 | 0.5789 | 0.9767 | 0.4883 | |
| 25 | 0.6039 | 0.9528 | 0.4764 | |
| 26 | 0.6289 | 0.9332 | 0.4666 | ↑ |
| 27 | 0.6539 | 0.9182 | 0.4591 | |
| 28 | 0.6789 | 0.9075 | 0.4537 | |
| 29 | 0.7039 | 0.9007 | 0.4503 | |
| 30 | 0.7289 | 0.8971 | 0.4485 | |
| 31 | 0.7539 | 0.8957 | 0.4478 | Throat Region |
| 32 | 0.7789 | 0.8955 | 0.4477 | |
| 33 | 0.8296 | 0.8955 | 0.4478 | |
| 34 | 0.8802 | 0.8956 | 0.4478 | |
| 35 | 0.9309 | 0.8956 | 0.4478 | ↓ |
| 36 | 0.9815 | 0.8957 | 0.4479 | |
| 37 | 1.0322 | 0.8958 | 0.4479 | |
| 38 | 1.0829 | 0.8959 | 0.4480 | |
| 39 | 1.1335 | 0.8961 | 0.4480 | Supersonic Section |
| 40 | 1.1842 | 0.8962 | 0.4481 | |
| 41 | 1.2348 | 0.8964 | 0.4482 | |
| 42 | 1.2855 | 0.8966 | 0.4483 | |
| 43 | 1.3361 | 0.8969 | 0.4484 | |
| 44 | 1.3868 | 0.8971 | 0.4486 | |
| 45 | 1.4375 | 0.8974 | 0.4487 | |

| IPT | X (inches) | A (inches) | B (inches) | |
|---|---|---|---|---|
| 46 | 1.4881 | 0.8977 | 0.4488 | Supersonic Section  |
| 47 | 1.5388 | 0.8980 | 0.4490 | |
| 48 | 1.5894 | 0.8983 | 0.4492 | |
| 49 | 1.6401 | 0.8987 | 0.4493 | |
| 50 | 1.6908 | 0.8991 | 0.4495 | |
| 51 | 1.7414 | 0.8995 | 0.4497 | |
| 52 | 1.7921 | 0.8999 | 0.4499 | |
| 53 | 1.8427 | 0.9003 | 0.4502 | |
| 54 | 1.8934 | 0.9008 | 0.4504 | |
| 55 | 1.9440 | 0.9012 | 0.4506 | |
| 56 | 1.9947 | 0/9017 | 0.4509 | |
| 57 | 2.0454 | 0.9022 | 0.4511 | |
| 58 | 2.0960 | 0.9028 | 0.4514 | |
| 59 | 2.1467 | 0.9033 | 0.4517 | |
| 60 | 2.1973 | 0.9039 | 0.4519 | |
| 61 | 2.2480 | 0.9045 | 0.4522 | |
| 62 | 2.2987 | 0.9051 | 0.4525 | |
| 63 | 2.3493 | 0.9057 | 0.4528 | |
| 64 | 2.4000 | 0.9063 | 0.4532 | |
| 65 | 2.4506 | 0.9070 | 0.4535 | |
| 66 | 2.5013 | 0.9076 | 04538 | |
| 67 | 2.5519 | 0.9083 | 0.4542 | |
| 68 | 2.6026 | 0.9091 | 0.4545 | |
| 69 | 2.6533 | 0.9098 | 0.4549 | |
| 70 | 2.7039 | 0.9105 | 0.4553 | |
| 71 | 2.7546 | 0.9124 | 04562 | |
| 72 | 2.8052 | 0.9142 | 0.4571 | |
| 73 | 2.8559 | 0.9160 | 0.4580 | |
| 74 | 2.9066 | 0.9177 | 0.4589 | |
| 75 | 2.9572 | 0.9195 | 0.4598 | |
| 76 | 3.0079 | 0.9213 | 0.4606 | |
| 77 | 3.0585 | 0.9230 | 0.4615 | |
| 78 | 3.1092 | 0.9247 | 0.4624 | |
| 79 | 3.1598 | 0.9264 | 0.4632 | |
| 80 | 3.2105 | 0.9281 | 0.4640 | |
| 81 | 3.2612 | 0.9297 | 0.4649 | |
| 82 | 3.3118 | 0.9314 | 0.4657 | |
| 83 | 3.3625 | 0.9330 | 0.4665 | |
| 84 | 3.4131 | 0.9346 | 0.4673 | |
| 85 | 3.4638 | 0.9362 | 0.4681 | |
| 86 | 3.5145 | 0.9378 | 0.4689 | |
| 87 | 3.5651 | 0.9394 | 0.4697 | |
| 88 | 3.6158 | 0.9409 | 0.4705 | |
| 89 | 3.6664 | 0.9425 | 0.4712 | |
| 90 | 3.7171 | 0.9440 | 0.4720 | |
| 91 | 3.7678 | 0.9455 | 0.4727 | |
| 92 | 3.8184 | 0.9470 | 0.4735 | |

| IPT | X (inches) | A (inches) | B (inches) | |
|---|---|---|---|---|
| 93 | 3.8691 | 0.9485 | 0.4742 | Supersonic Section  |
| 94 | 3.9197 | 0.9499 | 0.4750 | |
| 95 | 3.9704 | 0.9514 | 0.4757 | |
| 96 | 4.0210 | 0.9528 | 0.4764 | |
| 97 | 4.0717 | 0.9542 | 0.4771 | |
| 98 | 4.1224 | 0.9556 | 0.4778 | |
| 99 | 4.1730 | 0.9570 | 0.4785 | |
| 100 | 4.2237 | 0.9583 | 0.4792 | |
| 101 | 4.2743 | 0.9597 | 0.4798 | |
| 102 | 4.3250 | 0.9610 | 0.4875 | |
| 103 | 4.3757 | 0.9624 | 0.4812 | |
| 104 | 4.4263 | 0.9637 | 0.4818 | |
| 105 | 4.4770 | 0.9650 | 0.4825 | |
| 106 | 4.5276 | 0.9662 | 0.4831 | |
| 107 | 4.5783 | 0.9675 | 0.4838 | |
| 108 | 4.6289 | 0.9688 | 0.4844 | |
| 109 | 4.6796 | 0.9700 | 0.4850 | |
| 110 | 4.7303 | 0.9712 | 0.4056 | |
| 111 | 4.7809 | 0.9724 | 0.4862 | |
| 112 | 4.8316 | 0.9736 | 0.4868 | |
| 113 | 4.8822 | 0.9748 | 0.4874 | |
| 114 | 4.9329 | 0.9759 | 0.4880 | |
| 115 | 4.9836 | 0.9771 | 0.4885 | |
| 116 | 5.0342 | 0.9782 | 0.4891 | |
| 117 | 5.0849 | 0.9793 | 0.4897 | |
| 118 | 5.1355 | 0.9805 | 0.4902 | |
| 119 | 5.1862 | 0.9815 | 0.4908 | |
| 120 | 5.2368 | 0.9826 | 0.4913 | |
| 121 | 5.2875 | 0.9837 | 0.4918 | |
| 122 | 5.3382 | 0.9847 | 0.4924 | |
| 123 | 5.3888 | 0.9858 | 0.4929 | |
| 124 | 5.4395 | 0.9868 | 0.4934 | |
| 125 | 5.4901 | 0.9878 | 0.4939 | |
| 126 | 5.5408 | 0.9888 | 0.4944 | |
| 127 | 5.5915 | 0.9898 | 0.4949 | |
| 128 | 5.6421 | 0.9908 | 0.4954 | |
| 129 | 5.6928 | 0.9917 | 0.4959 | |
| 130 | 5.7434 | 0.9926 | 0.4963 | |
| 131 | 5.7941 | 0.9936 | 0.4968 | |
| 132 | 5.8338 | 0.9945 | 0.4972 | |
| 133 | 5.8954 | 0.9954 | 0.4977 | |
| 134 | 5.9461 | 0.9963 | 0.4981 | |
| 135 | 5.9967 | 0.9972 | 0.4986 | |
| 136 | 6.0474 | 0.9980 | 0.4990 | |
| 137 | 6.0980 | 0.9989 | 0.4994 | |
| 138 | 6.1487 | 0.9997 | 0.4998 | |
| 139 | 6.1994 | 1.000 | 0.5000 | |
| 140 | 6.2500 | 1.000 | 0.5000 | |

SHOCK-FREE SUPERSONIC ELLIPTIC NOZZLES AND METHOD OF FORMING SAME

ORIGIN OF THE INVENTION

The invention described herein was jointly made in the performance of work done under NASA Grant No. NASW 45041-18471 by an employee of the U.S. Government and a graduate student of Pennsylvania State University.

This is a continuation-in-part of copending application(s) Ser. No. 08/357,364, filed on Dec. 15, 1994, now abandoned which is a continuation of application Serial number 08/095,563 filed on Jul. 19, 1993 (now abandoned).

BACKGROUND OF THE INVENTION

1. Field of the Invention

This invention relates in general to jet nozzles and specifically to supersonic elliptic jet nozzles.

2. Description of the Related Art

In the past, nozzles with circular, i.e., axisymmetric, cross-sections were used for supersonic jet aircraft. These nozzles were designed such that they had cross-sectional areas which contracted until sonic flow of the gases was achieved at the throat of the nozzle. Then, after the throat of the nozzle, the nozzle expanded slightly until the flow achieved supersonic speed at nozzle exit. The supersonic portion of the nozzle is designed so that shock waves and thus shock noise were limited. This type of nozzle is known as a convergent-divergent nozzle.

One conventional method of designing circular nozzles was with the Inverse Method of Freidrichs. The Method of Freidrichs has been fully described in various publications, including K.O. Freidrichs, "Theoretical Studies on the Flow Through Nozzles and Related Problems," *NDRC Applied Math Panel, AMP Report* 82.1R, April 1944. This publication is hereby incorporated by reference.

In the Method of Freidrichs, the centerline velocity distribution is used an input parameter. Then, using the equations of the Method of Freidrichs, the streamlines are computed and the inner nozzle geometry coordinates are calculated from the boundary of the streamlines.

The Method of Freidrichs only works for fluid flow velocities up to approximately 1.2 Mach. Therefore, in nozzles which have a final Mach number which is over 1.2, the Method of Freidrichs can be used for the lower velocity portions of the nozzle, but a different design procedure must be used for the downstream, higher velocity nozzle portions.

Another conventional and quite successful way of designing circular nozzles is with the Method of Characteristics, which has been fully described in various publications, including Ascher H. Shapiro, *Thermodynamics of Compressible Fluid Flow*, Ronald Press (1953). This publication is hereby incorporated by reference.

The Method of Characteristics can be used for fluid velocities above 1.0 Mach, i.e., is not limited to fluid velocities below 1.2 Mach. There are quite a few different Method of Characteristics codes. In each, the nozzle is designed according to the parameter that the angle of the nozzle wall should be such that any wave incident to the surface of the nozzle wall would be a non-reflective wave. This minimizes the formation of shock waves.

All circular nozzles, even those designed by the Method of Characteristics and/or the Method of Freidrichs, still produced an undesirable amount of noise.

In the past there were attempts to design and build elliptic nozzles. However, all nozzles designed according to these procedures were convergent only. That is, the cross-sectional area of the nozzle only became smaller, thus resulting in large shock waves and noise.

Furthermore, none of the previous methods of designing elliptic nozzles translated the convergent-divergent circular nozzle geometry into elliptic coordinates.

SUMMARY OF THE INVENTION

Accordingly, it is an object of the present invention to achieve a method of forming elliptic nozzles which do not produce undesirable shock waves.

Another object of the present invention is to achieve a method of forming elliptic nozzles which translates the geometry of a circular nozzle designed by previous methods into elliptic coordinates.

Still another object of the present invention is to obtain an elliptic nozzle acoustically superior to previous nozzles.

These and other objects are accomplished by a method of forming an elliptic supersonic nozzle having the steps of dividing the nozzle to be designed into three sections, a circular-to-elliptic section which begins at a circular nozzle inlet, an elliptic subsonic section downstream from the circular-to-elliptic section and a supersonic section downstream from the elliptic subsonic section, determining the maximum and minimum radii for each axial point in the circular-to-elliptic section, the maximum and minimum radii being the radii for the widest part of the elliptic cross section and the narrowest part of the elliptic cross section, respectively, determining the maximum and minimum radii for each axial point in the elliptic subsonic section, determining the maximum and minimum radii for each axial point in the supersonic section based on the Method of Characteristics, and forming each of the three sections based on the determined maximum and minimum radii for each axial point in the respective section.

An elliptic jet nozzle according to the present invention has a circular- to-elliptic section attached at an upstream end to a circular inlet, an elliptic subsonic section downstream from the circular-to-elliptic section, the elliptic subsonic section having an aspect ratio which is constant for the section and a cross-sectional area which decreases in the downstream direction so that gases leaving the elliptic subsonic section are changing from subsonic to supersonic as they leave, and a supersonic elliptic section in which the gases flowing therein move at supersonic speeds, the supersonic section being downstream from the elliptic subsonic contraction section and having an aspect ratio which is constant for the section and an exit which allows supersonic gases to escape to the atmosphere.

BRIEF DESCRIPTION OF THE DRAWINGS

These and other objects of the present invention will be understood from the description herein, with reference to the accompanying drawings, in which:

FIG. 1(*b*) is a cross-sectional view taken along a minor axial plane of the nozzle formed according to the present invention;

FIG. 2(*a*) is a diagram showing pressure contours along the major axial plane of a supersonic nozzle section;

FIG. 2(b) is a diagram showing pressure contours along the minor axial plane of the supersonic nozzle section;

FIG. 6 is a diagram showing the perceived noise level for different nozzle shapes at different angles to a nozzle axis, with FIG. 7 is a table showing the dimensions of the interior of the nozzle;

DETAILED DESCRIPTION OF THE PREFERRED EMBODIMENT

Figure 1A:
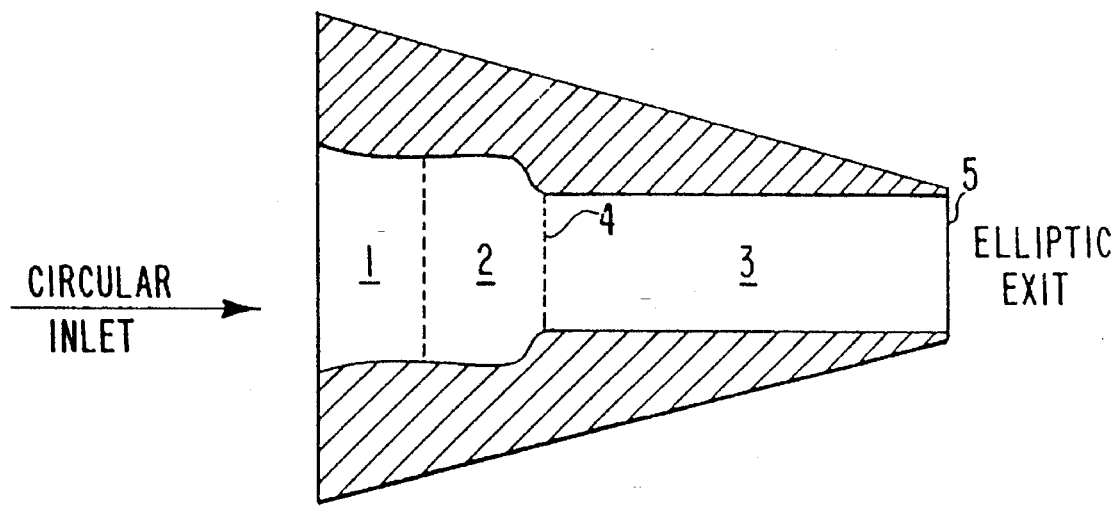
FIG. 1(*a*) is a cross-sectional view taken along a major axial plane of a nozzle formed according to the present invention.
Figure 1B:
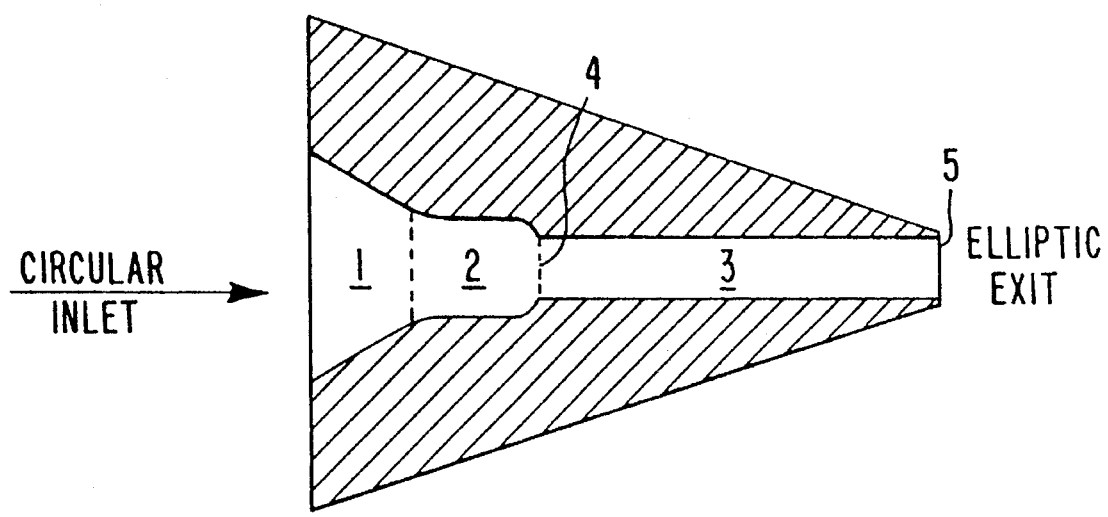

FIGS. 1(a) and 1(b) are cross-sectional diagrams of a nozzle designed according to the present invention. As shown in FIGS. 1(a) and 1(b), the nozzle internal geometry is divided into three sections. The first section is a circular-to-elliptic transition section 1. At its upstream end, it is connected to a circular nozzle inlet. The second section is an elliptic subsonic section 2. It is downstream from the circular-to-elliptic section 1. The third section is a supersonic section 3. It is downstream from the elliptic subsonic section 2.

The resulting elliptic cross-sectional shape at the end of the circular-to-elliptic section has a cross-section with major radii at the widest part of the ellipse and minor radii at the narrowest part of the ellipse. FIG. 1(a) is a view along the major axial plane and FIG. 1(b) is a view taken along the minor axial plane.

The shape, i.e., the nozzle coordinates, of all three sections of the nozzle, is determined from the major and minor radii at each axial point of the nozzle. Thus, an explanation follows of how the minor and major radii are calculated.

The circular-to-elliptic section translates the circular geometry of the circular nozzle inlet into an elliptic shape. Flow in this section is subsonic. The major radius $a(x)$ at each point in the circular-to-elliptic section is determined according to $$a(x) = R_i + SX + C_1 X^2 + C_2 X^3 \qquad (1)$$

where $R_i$ is the circular nozzle inlet radius, $S$ is the slope of the walls at the circular nozzle inlet in the direction of the major axis and x is the axial distance from the circular nozzle inlet. $C_1$ and $C_2$ are constants. $C_1$ is determined according to $$C_1 = \frac{2(R_i - A_L) + SX_L}{X_L^3}, \qquad (2)$$

where $A_L$ is the major radius at the end of the circular-to-elliptic section which is chosen based upon the necessity to keep the nozzle convergent in the circular-to-elliptic section and possibly based upon the desired Mach flow velocity at the end of the circular-to-elliptic section, for example Mach 0.3. $X_L$ is the length of the circular-to-elliptic section which is determined by space constraints as an upper boundary, and by the maximum slope of the inwardly sloping nozzle walls as a lower boundary. If the nozzle walls in the circular-to-elliptic section change slope too rapidly, there will be gas separation at the walls of the nozzle. Note that the maximum slope of the nozzle walls is, for example, $-13.6°$. $C_2$ is determined according to $$C_2 = -\left\{ \frac{S + 3C_1 X_L^2}{2X_L} \right\}. \qquad (3)$$

As shown in FIG. 1(b), the minor radii is reduced throughout the circular-to-elliptic section. Thus, the nozzle slopes inwardly. The inward slope helps reduce the boundary layer. The minor radius $b(x)$ at each axial point in the circular-to-elliptic section is determined according to $$b(x) = \frac{a(x)}{1 + (A_r - 1)\frac{x}{X_L}}, \qquad (4)$$

where $A_r$ is the aspect ratio which is the ratio of the major radii to the minor radii. According to a preferred embodiment, the aspect ratio is kept constant throughout the elliptic subsonic and the supersonic sections of the nozzle. However, it could be varied. The present forming method will work for aspect ratios over 1.0. However, aspect ratios in the range of 2 to 3 have been found to be optimal.

The elliptic subsonic section 2 is the section immediately downstream from the circular-to-elliptic section. This section contracts so that by the end of the section the gas flow is sonic.

The major and minor radii, and each axial point in the elliptic subsonic section, and thereby the wall coordinates, are derived from the coordinates of a corresponding axisymmetric, i.e., circular, nozzle. Specifically, according to the present invention, the elliptic nozzle coordinates are determined from the corresponding axisymmetric nozzle radii $R(x)$ at each axial point in the corresponding axisymmetric section The corresponding axisymmetric nozzle radii $R(x)$ are determined, for example, by the Inverse Method of Freidrichs. The major nozzle radii $a(x)$ are determined according to $$a(x) = R(x) (A_r)^{1/2}, \qquad (5)$$

wherein $A_r$ is the aspect ratio which is held constant for the elliptic subsonic section and, according to a preferred embodiment, is 2.

The minor nozzle radii $b(x)$ are simply determined from the constant aspect ratio $A_r$ $$b(x) = \frac{a(x)}{A_r}. \qquad (6)$$

The supersonic section 3 is the section immediately downstream from the elliptic subsonic section. It begins at the throat 4 of the nozzle, which is the smallest point of the nozzle and the point at which the gas flow is sonic (Mach 1.0). It ends at the nozzle exit.

To avoid shock waves, there is no contraction in the supersonic section. Instead, as can be seen from FIGS. 1(a) and 1(b), the nozzle expands slightly in the supersonic section.

The nozzle coordinates in the supersonic section are approximated from corresponding axisymmetric nozzle coordinates R(x) again using equations (2) and (3). However, the radii of the corresponding axisymmetric nozzle R(x) can no longer be approximated by the Inverse Method of Freidrichs because the flow velocity in the supersonic section may exceed Mach 1.2, and because the second derivative of the nozzle wall in the axial direction downstream of the throat becomes negative, for which the Inverse Method of Freidrichs is inappropriate. Therefore, a different axisymmetric design code must be used and, preferably, the Method of Characteristic is used.

In forming the circular-to-elliptic section, the length of the section was selected to be 1.825". The circular-to-elliptic section translated an inlet circular cross-section with a radius of 1.549" to an elliptic cross-section with an aspect ratio of 2. At the end of the circular-to-elliptic section, the major radius was 1.414" and the minor radius was 0.707". Flow at the end of the circular-to-elliptic section was 0.24 Mach. The end of the circular-to-elliptic section was also formed to accommodate a 40×40 mesh stainless steel screen to aid in smoothing any flow irregularities. Testing of the nozzle without the screen demonstrated that the screen was unnecessary, but may still be required for those flows that have substantial non-uniformities.

As stated above, the aspect ratio for the elliptic subsonic section and the supersonic section was kept constant at 2 and the flow at the end of the elliptic subsonic section was sonic.

The flow field for the designed nozzle was predicted using Navier-Stokes Equations. FIGS. 2(a) and 2(b) respectively show pressure contours along the major and minor axial planes of the supersonic section calculated using a Navier-Stokes Code. There are several different published Navier-Stokes Codes, one of which is published in A. Kumar, "Numerical Simulation of Scramjet Inlet Flow Fields," NASA TP-2517. This publication is hereby incorporated by reference. In FIGS. 2(a) and 2(b) each approximately vertical line within the nozzle represents a pressure variation (pressure contour) of about 5000 newtons per meter squared (n/m$^2$). The elliptic section towards the nozzle exit represents a region where the pressure is slightly under 110,000 n/m$^2$, which is just slightly above atmospheric pressure.

As can be seen from FIGS. 2(a) and 2(b), the pressure contours along both the major and minor axes are generally smooth except for small oscillations in the pressure contours of the minor axis which are confined to near the wall of the nozzle. Thus, there is no sign of shock formation and no noise is expected due to shock turbulence interaction.

Figure 3A:
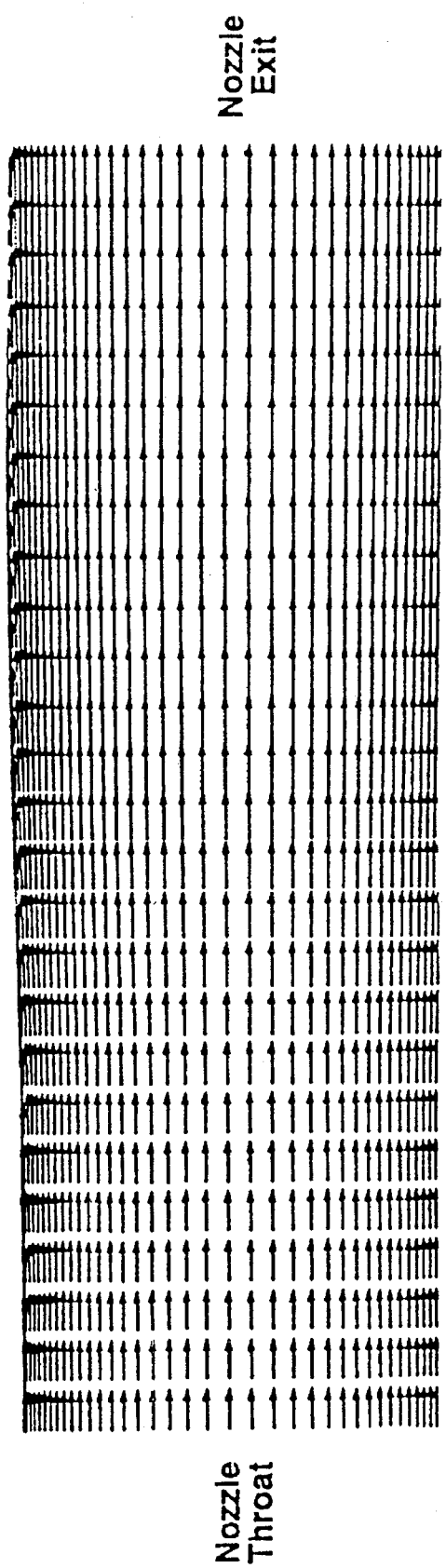
FIG. 3(a) is a diagram showing velocity vectors along the major axial plane of the supersonic section.
Figure 3B:
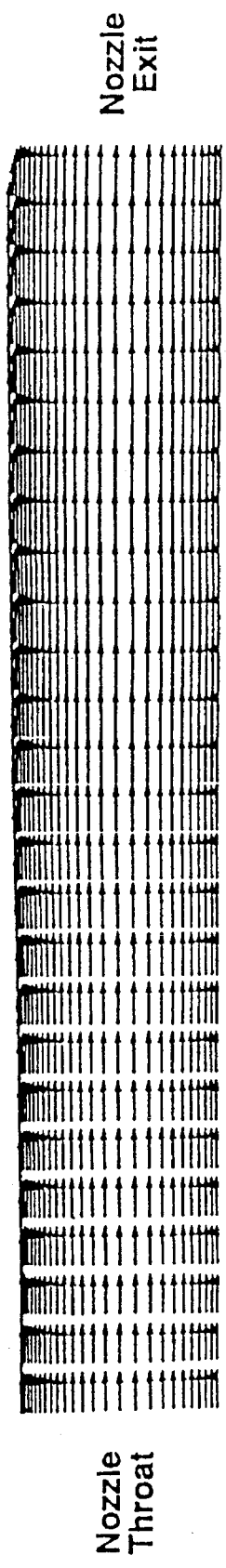
FIG. 3(b) is a diagram showing velocity vectors along the minor axial plane of the supersonic section.

FIGS. 3(a) and 3(b) respectively show the velocity vectors along the major and minor axial planes of the supersonic section, as computed according to the Navier-Stokes code. The length of each vector is proportional to the velocity at that point. As can be seen from FIGS. 3(a) and 3(b), the velocity at the nozzle exit appears uniform except for only a thin boundary layer at the walls of the nozzle. Thus, velocity vector analysis also indicates that the expected noise would not contain any shock/turbulence generated noise.

The nozzle was constructed in halves and joined along the minor axis. The nozzle was experimentally tested for its acoustic properties and to verify the correctness of the predicted calculated results.

Figure 4A:
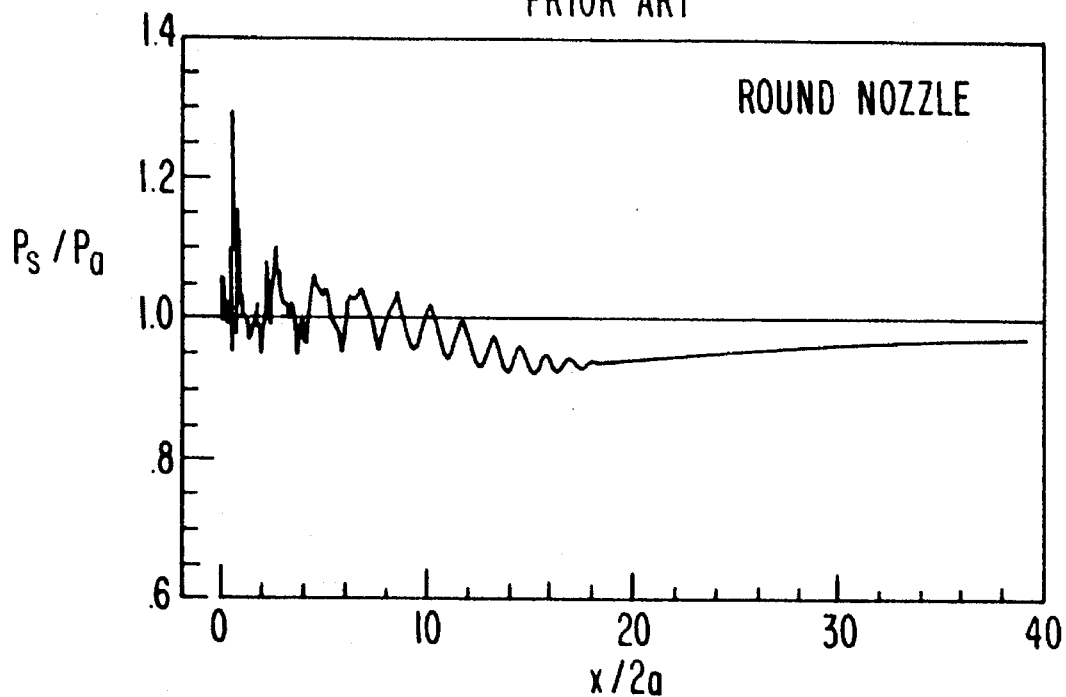
FIG. 4(a) is a diagram showing variations in a ratio of the plume static pressure to the ambient pressure for an axisymmetric nozzle of the prior art.

FIG. 4(a) shows variations in a ratio of the plume static pressure to the ambient pressure for an axisymmetric nozzle of the prior art. The x axis represents a distance x away from the nozzle exit (exterior to the nozzle) divided by the major diameter 2a at the nozzle exit. The y axis represents the ratio of the plume static pressure $P_s$ to the ambient pressure $P_a$. The plume static pressure is the pressure along the centerline of the nozzle at a distance away from the nozzle exit. As can be seen from FIG. 4(a), the plume static pressure falls below the ambient pressure. This is due to surrounding fluid entrained in the high speed gases. As can be seen from the peak at about x/2a=0.1, there was an undesirably large variation in the pressure ratio $P_s/P_a$ in the circular nozzle. It varied as much as 0.3.

Figure 4B:
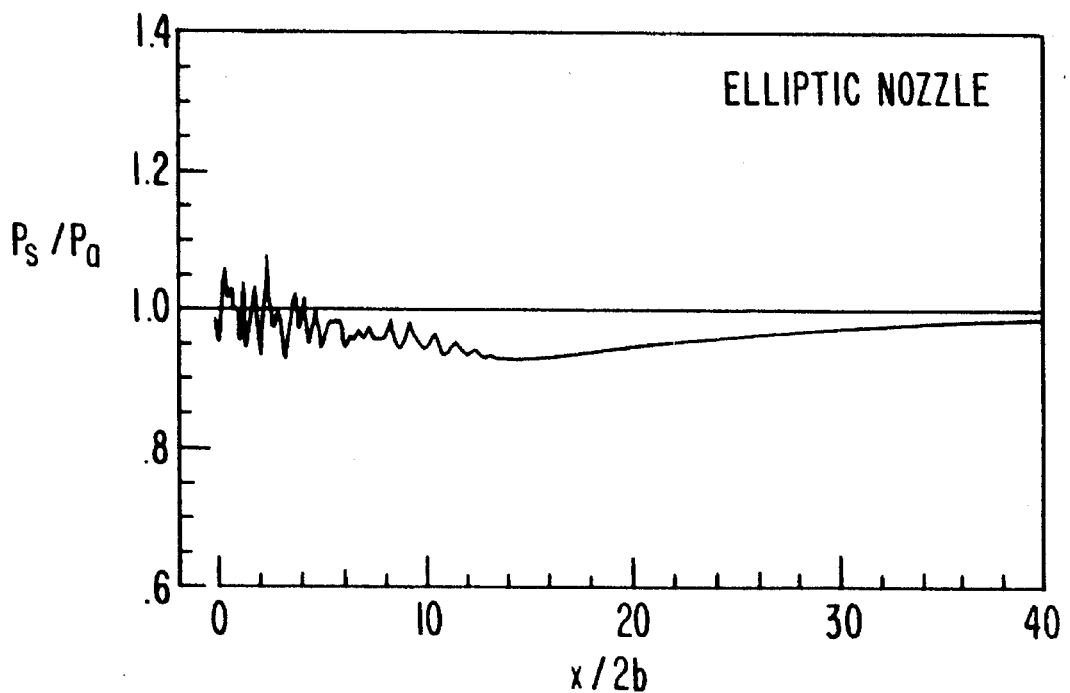
FIG. 4(b) is a diagram showing variations in the ratio of the plume static pressure to the ambient pressure for an elliptic nozzle according to the present invention.

It is an important criterion for the present invention that the pressure ratio $P_s/P_a$ not vary more than 0.1. FIG. 4(b) shows variations in the ratio of the plume static pressure to the ambient pressure for an elliptic nozzle formed according to the present invention. The x axis represents the distance x away from the nozzle exit divided by the length 2b of a minor diameter at the nozzle exit. As can be seen from FIG. 4(b), the elliptic nozzle satisfies this design criteria.

Figure 5:
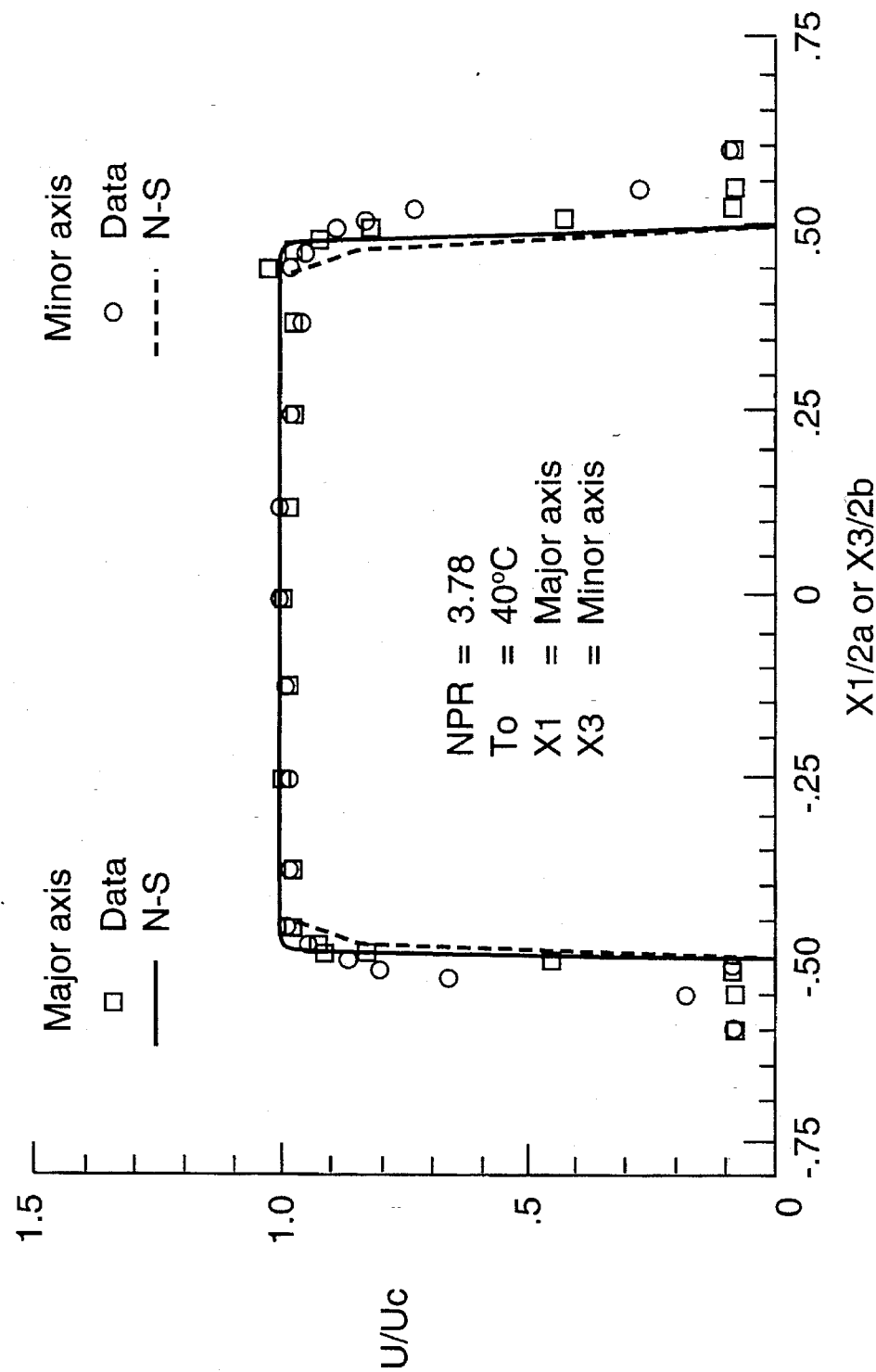
FIG. 5 is a diagram showing the predicted and the tested Mach flow velocities at the nozzle exit for both the major and minor axes.
Figure 7B:
Figure 7C:
Figure 8:
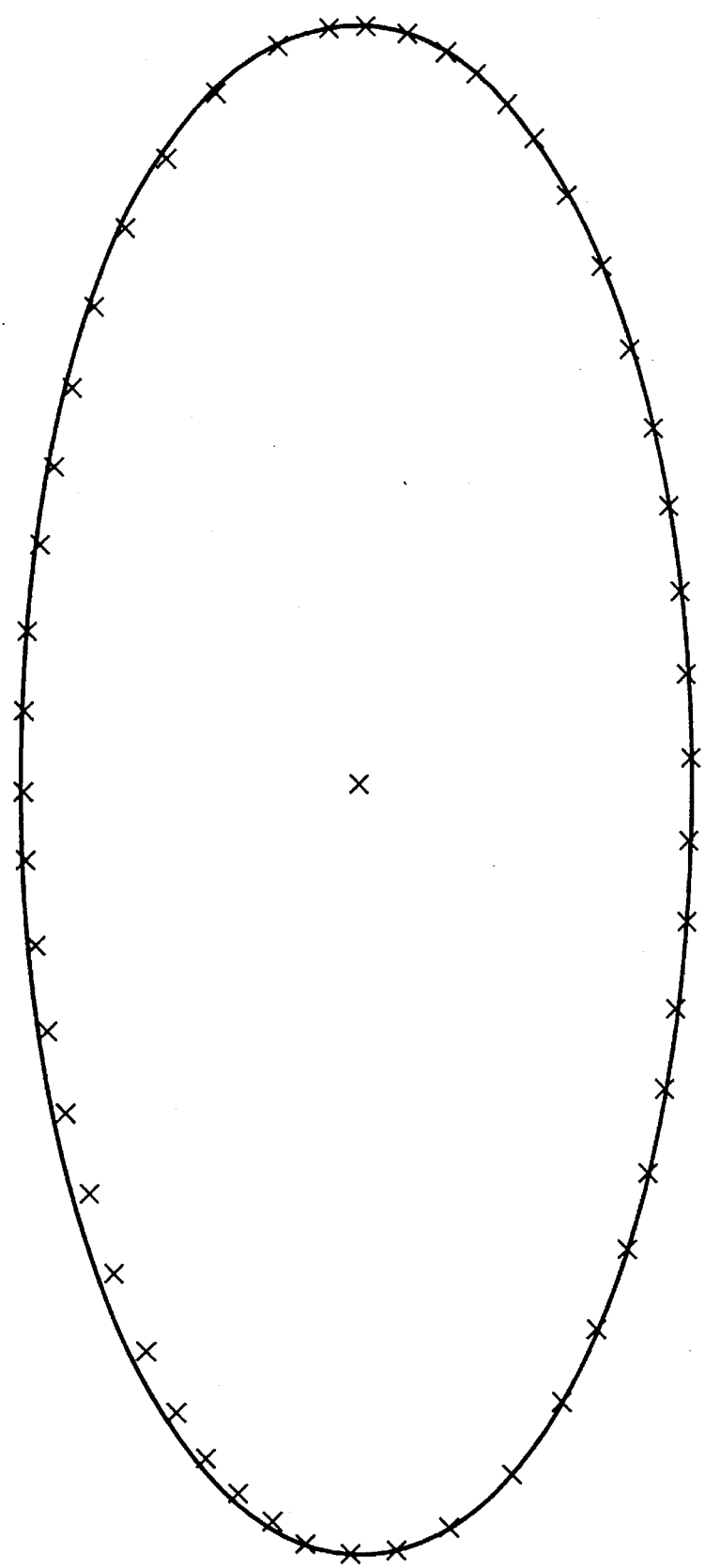
FIG. 8 is a cross sectional view of the elliptical section of the nozzle.
Figure 9:
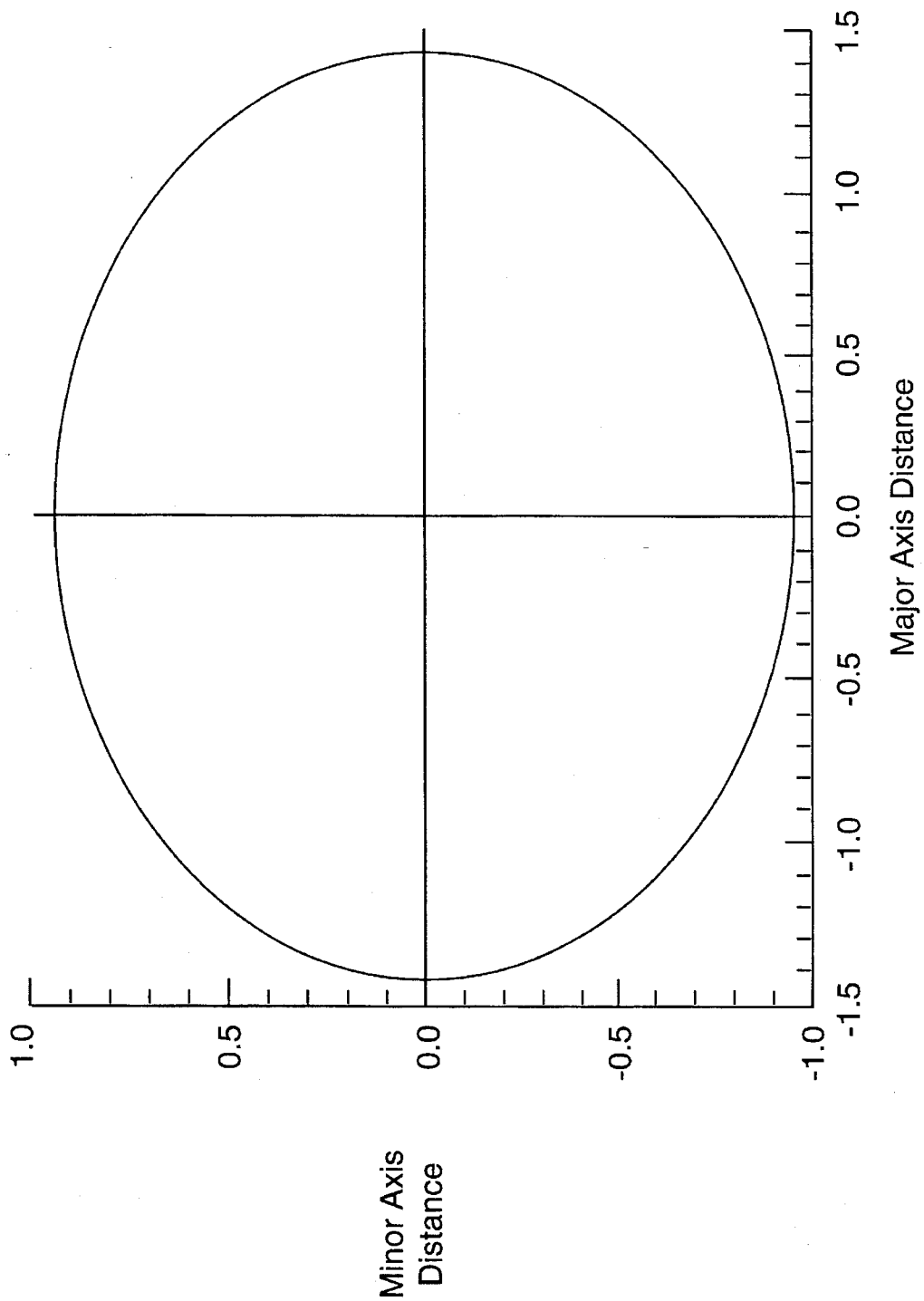
FIG. 9 is a cross sectional view of the circular to elliptic cross-section of the nozzle.

FIG. 5 shows the predicted and the tested velocity Mach numbers at the nozzle exit for both the major and minor axes. The square and circular plots in FIG. 5 represent the measured Mach numbers along the major and minor axes, respectively. The solid and dotted lines represent the Navier-Stokes predicted Mach numbers along the major and minor axes, respectively. The x axis represents the fractional distance from the centerline and is either the distance $X_a$ along the major axis divided by length 2a of the major axis or the distance $X_b$ along the minor axis divided by length 2b of the minor axis. The y axis represents the Mach number.

As can be seen from FIG. 5, after a thin boundary layer at the nozzle wall, the flow velocity is uniform at the desired 1.5 Mach at both the major and minor axis. FIG. 5 also shows that the predicted flow velocities are very close to the experimentally measured velocities.

Elliptic nozzles formed according to the above-described method were tested and found to be superior to round nozzles in noise reduction. Nozzles which produced a Mach 1.5 flow across the exit plane of the nozzle were produced and tested, the results of which are shown in FIG. 6. FIG. 6 is a diagram showing the perceived noise level for different nozzle shapes. In FIG. 6, the y-axis represents the perceived noise level in decibels. All noise measurements were taken along a straight line 1,459' from the centerline of the jet (FAR 36 sideline observation points). The x-axis represents the directivity angle, the angle from the nozzle exit relative to the centerline of the exiting stream of the gases (plume). As can be seen from the diagram, four types of nozzles were tested, Mach 1.0 round nozzles, Mach 1.5 round nozzles, Mach 1.5 Aden Nozzles and Mach 1.5 elliptic nozzles. The noise for all tested nozzles was scaled to a single constant mass flow rate and a single constant thrust of 50,000 lbs. It is known that noise at a directivity angle of less than 60° is dominated by shock noise, and noise at a directivity angle of greater than above 120° is dominated by jet mixing noise. As can be seen from FIG. 6, the elliptic nozzle was superior to the other tested nozzles in both the region where shock noise dominated and the region where jet mixing noise dominated. It can also be observed that although the Aden nozzle performed well in the region where jet mixing noise dominated, it was louder in the region where shock noise dominated.

Numerous modifications and adaptations of the present invention will be apparent to those skilled in the art. For example, minor modifications may be made to the equations herein. Thus, the following claims are intended to cover all such modifications and adaptations which fall within the true spirit and scope of the present invention.

What is claimed is:

1. A method of forming an elliptic supersonic nozzle having unequal major and minor axes, comprising the steps of:
   (a) providing design coordinates of a round supersonic nozzle which will translate to the elliptical supersonic nozzle to be formed;
   (b) translating the coordinates of the round nozzle into elliptic nozzle coordinates; and
   (c) forming the elliptic supersonic nozzle based on the elliptic nozzle coordinates.

2. A method of forming an elliptic supersonic nozzle having unequal major and minor axes, comprising the steps of:
   (a) dividing the nozzle to be formed into three sections, a circular-to-elliptic section which begins at a circular nozzle inlet, an elliptic subsonic section downstream from the circular-to-elliptic section and a supersonic section downstream from the elliptic subsonic section;
   (b) determining the major and minor radii for each axial point in the circular-to-elliptic section, the major and minor radii being the radii for the widest part of an elliptic cross-section and the narrowest part of the elliptic cross-section, respectively;
   (c) determining the major and minor radii for each axial point in the elliptic subsonic section;
   (d) determining the major and minor radii for each axial point in the supersonic section; and
   (e) forming each of the three sections based on the major and minor radii for each axial point in the respective section.

3. The method of forming an elliptic supersonic nozzle as claimed in claim 2, wherein step (d) further comprises the substeps of:
   selecting an aspect ratio $A_r$ greater than 1.0, the aspect ratio being the ratio of the major radius to the minor radius for each axial point in the elliptic subsonic section and the supersonic section;
   determining the radii $R(x)$ for each point of a supersonic section of a circular nozzle;
   determining the major radii $a(x)$ for each axial point of the supersonic section from the equation $$a(x) = R(x) (A_r)^{1/2}; \text{ and} \tag{5}$$

determining the minor radii $b(x)$ for each axial point of the supersonic section from the equation $$b(x) = \frac{a(x)}{A_r}. \tag{6}$$

4. The method of forming an elliptic supersonic nozzle as claimed in claim 2, wherein step (c) further comprises the substeps of: selecting an aspect ratio A, greater than 1.0, the aspect ratio being the ratio between major radius and the minor radius for each axial point in the elliptic subsonic section and the supersonic section;
   determining the radii $R(x)$ for each point of a contracting subsonic section of a circular nozzle;
   determining the major radii $a(x)$ for each axial point of the elliptic contracting section from the equation $$a(x) = R(x) (A_r)^{1/2}; \text{ and} \tag{5}$$

determining the minor radii $b(x)$ for each axial point of the elliptic contracting section from the equation $$b(x) = \frac{a(x)}{A_r}. \tag{6}$$

5. The method of forming an elliptic supersonic nozzle as claimed in claim 4, wherein step (d) further comprises the substeps of:
   determining the radii $R(x)$ for each point of a supersonic throat section of a supersonic circular nozzle;
   determining the major radii $a(x)$ for each axial point of the supersonic section from the equation $$a(x) = R(x) (A_r)^{1/2}; \text{ and} \tag{5}$$

determining the minor radii $b(x)$ for each axial point of the supersonic section from the equation $$b(x) = \frac{a(x)}{A_r}. \tag{6}$$

6. The method of forming an elliptic supersonic nozzle as claimed in claim 4, wherein the aspect ratio is selected to be approximately 2.

7. The method of forming an elliptic supersonic nozzle as claimed in claim 3, wherein the aspect ratio is selected to be approximately 2.

8. The method of forming an elliptic supersonic nozzle as claimed in claim 2, wherein step (b) further comprises the substeps of: selecting a major nozzle radius $A_L$, at a downstream end of the circular-to-elliptic section which is less than the circular nozzle inlet radius $R_i$ and which results in a subsonic velocity at a downstream end of the circular-to-elliptic section;
   selecting a length $X_L$ of the circular-to-elliptic section which will prevent gas separation at the wall of the circular-to-elliptic section;
   selecting an aspect ratio $A_r$ greater than 1.0, the aspect ratio being the ratio of the major radius to the minor radius for each axial point in the elliptic subsonic section and the supersonic section;
   determining the major radii $a(x)$ for each axial point of the circular to elliptic section from the equation $$a(x) = R_i + Sx + C_1 x^2 + C_2 x^3, \tag{1}$$

where S is the slope of the walls at the circular nozzle inlet, x is the axial distance from the circular nozzle inlet and $C_1$ and $C_2$ are constants;
   determining $C_1$ from the equation $$C_1 = \frac{2(R_i - A_L) + SX_L}{X_L^3}; \tag{2}$$

determining $C_2$ from the equation $$C_2 = -\left\{ \frac{S + 3C_1 X_L^2}{2X_L} \right\}; \text{ and} \tag{3}$$

determining the minor radii $b(x)$ for each axial point of the circular to elliptic section from the equation $$b(x) = \frac{a(x)}{1 + (A_r - 1)\frac{x}{X_L}}. \tag{4}$$

9. The method of forming an elliptic supersonic nozzle as claimed in claim 8, wherein step (d) further comprises the substeps of:
   determining the radii $R(x)$ for each point of a supersonic throat section of a supersonic circular nozzle;
   determining the major radii $a(x)$ for each axial point of the supersonic section from the equation $$a(x) = R(x) \, (A_r)^{1/2}; \text{ and} \tag{5}$$

determining the minor radii b(x) for each axial point of the supersonic section from the equation $$b(x) = \frac{a(x)}{A_r} . \tag{6}$$

10. The method of forming an elliptic supersonic nozzle as claimed in claim 8, wherein step (c) further comprises the substeps of:

determining the radii R(x) for each point of a contracting section of a circular nozzle;

determining the major radii a(x) for each axial point of the elliptic contracting section from the equation $$a(x) = R(x) \, (A_r)^{1/2}; \text{ and} \tag{5}$$

determining the minor radii b(x) for each axial point of the elliptic contracting section from the equation $$b(x) = \frac{a(x)}{A_r} . \tag{6}$$

11. The method of forming an elliptic supersonic nozzle as claimed in claim 8, wherein the major nozzle radius $A_L$ at a downstream end of the circular-to-elliptic section is selected so that a flow velocity of approximately Mach 0.3 results at the downstream end of the circular-to-elliptic section.

12. The method of forming an elliptic supersonic nozzle as claimed in claim 8, wherein the aspect ratio is selected to be approximately 2.

13. The method of forming an elliptic supersonic nozzle as claimed in claim 10, wherein step (d) further comprises the substeps of:

determining the radii R(x) for each point of a supersonic throat section of a circular nozzle;

determining the major radii a(x) for each axial point of the supersonic section from the equation $$a(x) = R(x) \, (A_r)^{1/2}; \text{ and} \tag{5}$$

determining the minor radii b(x) for each axial point of the supersonic section from the equation $$b(x) = \frac{a(x)}{A_r} . \tag{6}$$

14. An elliptic jet nozzle, comprising: a circular-to-elliptic section attached at an upstream end to a circular inlet;

an elliptic subsonic section having unequal major and minor axes downstream from the circular-to-elliptic section, the elliptic subsonic section having an aspect ratio which is constant for the section and a cross-sectional area which decreases in the downstream direction so that gases leaving the elliptic subsonic section are sonic as they leave; and a supersonic elliptic section in which the gases flowing therein move at supersonic speeds, the supersonic section being downstream from the elliptic subsonic contraction section, having an aspect ratio which is constant for the section and an exit which allows supersonic gases to escape to the atmosphere.

15. The elliptic jet nozzle as claimed in claim 14, wherein the aspect ratio for the elliptic subsonic section is equivalent to the aspect ratio of the supersonic elliptic section.

\* \* \* \* \*